(12) United States Patent
Park et al.

(10) Patent No.: US 11,390,022 B2
(45) Date of Patent: Jul. 19, 2022

(54) THREE-DIMENSIONAL FABRICATING APPARATUS AND THREE-DIMENSIONAL FABRICATING METHOD

(71) Applicants: Soyoung Park, Kanagawa (JP); Takafumi Sasaki, Kanagawa (JP)

(72) Inventors: Soyoung Park, Kanagawa (JP); Takafumi Sasaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 582 days.

(21) Appl. No.: 16/297,887

(22) Filed: Mar. 11, 2019

(65) Prior Publication Data

US 2019/0283317 A1 Sep. 19, 2019

(30) Foreign Application Priority Data

Mar. 13, 2018 (JP) .............................. JP2018-045186

(51) Int. Cl.
*B29C 64/165* (2017.01)
*B29C 64/386* (2017.01)
(Continued)

(52) U.S. Cl.
CPC .......... *B29C 64/165* (2017.08); *B29C 64/135* (2017.08); *B29C 64/209* (2017.08);
(Continued)

(58) Field of Classification Search
None
See application file for complete search history.

(56) References Cited

U.S. PATENT DOCUMENTS 9,919,475 B2  3/2018 Sasaki
2009/0004381 A1  1/2009 Fujisawa et al.
(Continued)

FOREIGN PATENT DOCUMENTS

JP  2009-006538  1/2009
JP  WO-2017011007 A1  1/2017
(Continued)

OTHER PUBLICATIONS

Osawa et al., JP 2005-007572, English Translation from J-Plat-Pat (Year: 2005).*
(Continued)

*Primary Examiner* — Colin W. Slifka
(74) *Attorney, Agent, or Firm* — Harness, Dickey & Pierce, P.L.C.

(57) ABSTRACT

According to an embodiment, a three-dimensional fabricating apparatus includes a supply unit, a flattening unit, a discharge unit, and a controller. The supply unit is configured to supply powder. The flattening unit is configured to flatten a surface of the supplied powder and form a powder layer. The discharge unit is configured to discharge a first fabrication liquid solidifying the powder and a second fabrication liquid not solidifying the powder onto a surface of the powder layer. The controller is configured to cause the discharge unit to discharge the first fabrication liquid and the second fabrication liquid in accordance with a discharge pattern in which the second fabrication liquid is discharged to a region adjacent to at least some of a plurality of regions in which the first fabrication liquid is discharged.

14 Claims, 13 Drawing Sheets

(51) Int. Cl.
*B29C 64/135* (2017.01)
*G06F 9/30* (2018.01)
*B33Y 30/00* (2015.01)
*B29C 64/209* (2017.01)
*B33Y 10/00* (2015.01)

(52) U.S. Cl.
CPC ............ *B29C 64/386* (2017.08); *B33Y 10/00* (2014.12); *B33Y 30/00* (2014.12); *G06F 9/30003* (2013.01)

(56) References Cited

U.S. PATENT DOCUMENTS

| | | |
|---|---|---|
| 2015/0343533 A1 | 12/2015 | Park et al. |
| 2016/0067929 A1 | 3/2016 | Park |
| 2016/0214320 A1 | 7/2016 | Sasaki et al. |
| 2016/0243765 A1 | 8/2016 | Sasaki et al. |
| 2016/0361874 A1 | 12/2016 | Park et al. |
| 2016/0368214 A1 | 12/2016 | Sasaki et al. |
| 2017/0095979 A1 | 4/2017 | Sasaki |
| 2017/0106589 A1 | 4/2017 | Ishida et al. |
| 2017/0173887 A1 | 6/2017 | Sasaki |
| 2017/0252975 A1 | 9/2017 | Park |
| 2017/0259456 A1 | 9/2017 | Sasaki et al. |
| 2017/0305142 A1* | 10/2017 | Yamaguchi ............ B33Y 30/00 |
| 2018/0133972 A1 | 5/2018 | Morovic et al. |
| 2019/0111619 A1 | 4/2019 | Schalk et al. |

FOREIGN PATENT DOCUMENTS

| | | |
|---|---|---|
| JP | 2017-075361 | 4/2017 |
| JP | 2018001686 A | 1/2018 |
| WO | WO-2016/171724 A1 | 10/2016 |
| WO | WO-2018017136 A1 | 1/2018 |

OTHER PUBLICATIONS

Extended European Search Report dated Jul. 30, 2019, issued in corresponding European Patent Application No. 19161462.7.
European Office Action dated Nov. 2, 2020 issued in corresponding European Appln. No. 19161462.7.

* cited by examiner

FIG.5
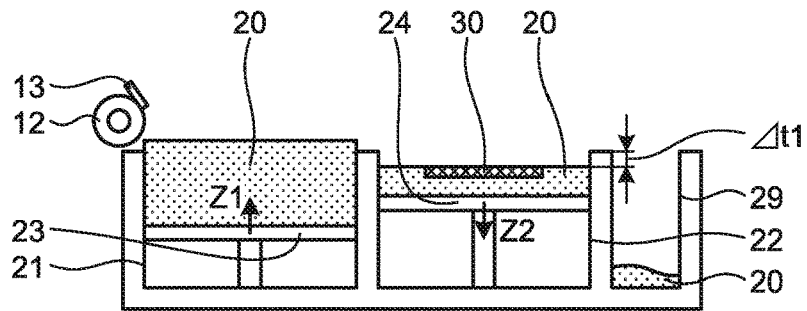
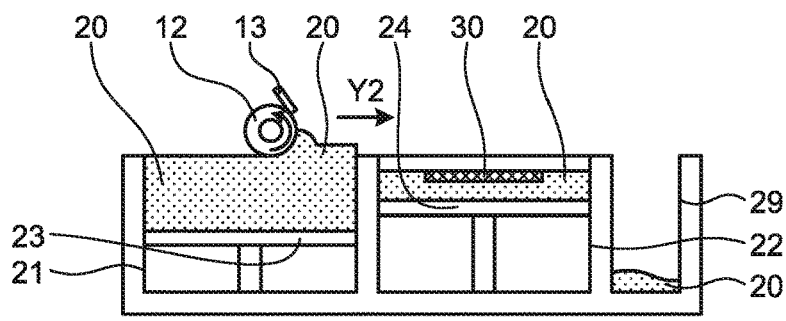
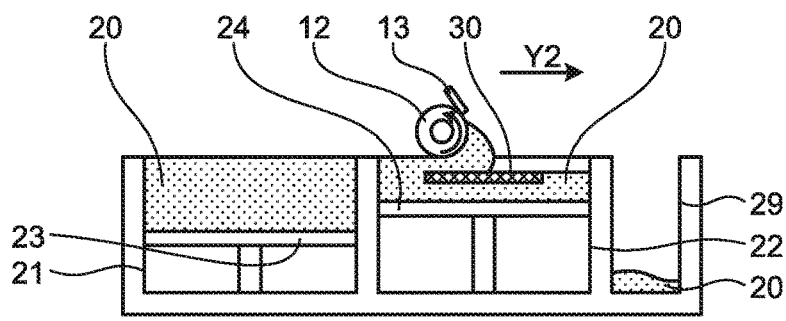
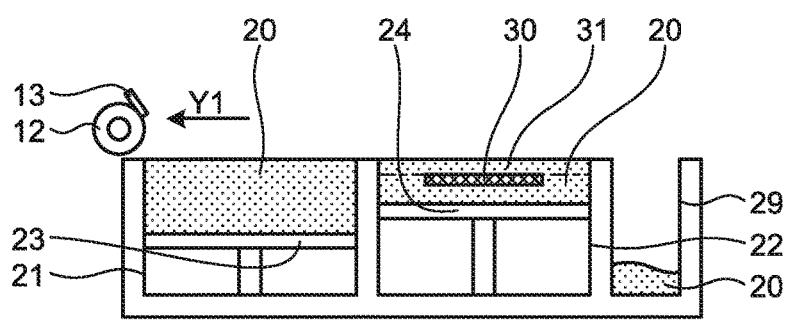
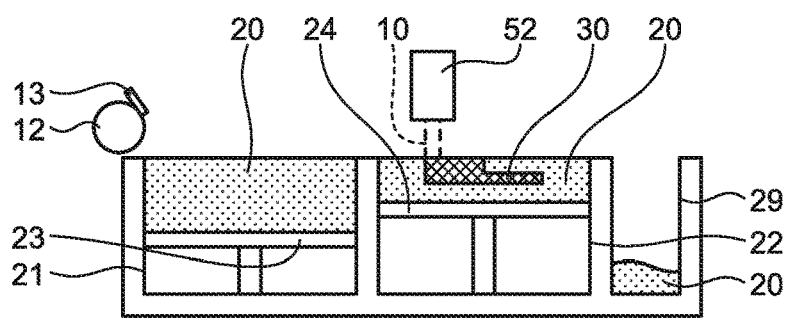

THREE-DIMENSIONAL FABRICATING APPARATUS AND THREE-DIMENSIONAL FABRICATING METHOD

CROSS-REFERENCE TO RELATED APPLICATIONS

The present application claims priority under 35 U.S.C. § 119 to Japanese Patent Application No. 2018-045186, filed on Mar. 13, 2018. The contents of which are incorporated herein by reference in their entirety.

BACKGROUND OF THE INVENTION

1. Field of the Invention

Embodiments relate to a three-dimensional fabricating apparatus and a three-dimensional fabricating method.

2. Description of the Related Art

A three-dimension fabricating method by a powder lamination method (hereinafter referred to as a powder lamination fabricating method) is roughly classified into a laser sintering method (LS), an electron beam sintering method (EBM), and a binder jetting method. In general, in the binder jetting method, powder is used, and in this technique, binder ink is discharged from an inkjet head to solidify the powder and thus to perform fabrication.

There has been proposed a technique in which binder ink used for binding (solidifying) a powder material and ink not bonding (not solidifying) the powder material are discharged from an inkjet head onto a thin film with the above-described powder spread thereon, so that, at a boundary between a region in which the powder material is bound and a region in which the powder material is not bound, it makes it easy to remove the powder in the region in which the powder material is not bound, and thus to ensure accuracy of a fabricated product. Examples of conventional techniques are described in Japanese Unexamined Patent Application Publication No. 2009-006538 and Japanese Unexamined Patent Application Publication No. 2017-075361.

However, in the prior art, the accuracy of a fabricated product may be reduced in some cases. For example, when discharge is performed in accordance with a mask pattern in order to enhance accuracy and when a liquid is discharged with a plurality of pass interlaces in order to discharge the liquid with increasing the resolution higher than the resolution of a mounting head, a solidifying liquid and a non-solidifying liquid are discharged to positions away from each other. Thus, each liquid bleeds and spreads, which sometimes leads to reduced accuracy.

In view of the above, there is a need to provide a three-dimensional fabricating apparatus capable of improving the accuracy of a fabricated product fabricated by a powder lamination fabricating method.

SUMMARY OF THE INVENTION

It is an aim of the present invention to at least partially solve the problems in the conventional technology.

According to an embodiment, a three-dimensional fabricating apparatus includes a supply unit, a flattening unit, a discharge unit, and a controller. The supply unit is configured to supply powder. The flattening unit is configured to flatten a surface of the supplied powder and form a powder layer. The discharge unit is configured to discharge a first fabrication liquid solidifying the powder and a second fabrication liquid not solidifying the powder onto a surface of the powder layer. The controller is configured to cause the discharge unit to discharge the first fabrication liquid and the second fabrication liquid in accordance with a discharge pattern in which the second fabrication liquid is discharged to a region adjacent to at least some of a plurality of regions in which the first fabrication liquid is discharged.

BRIEF DESCRIPTION OF THE DRAWINGS

FIG. 5 is an explanatory view for explaining a flow of fabrication of the embodiment;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
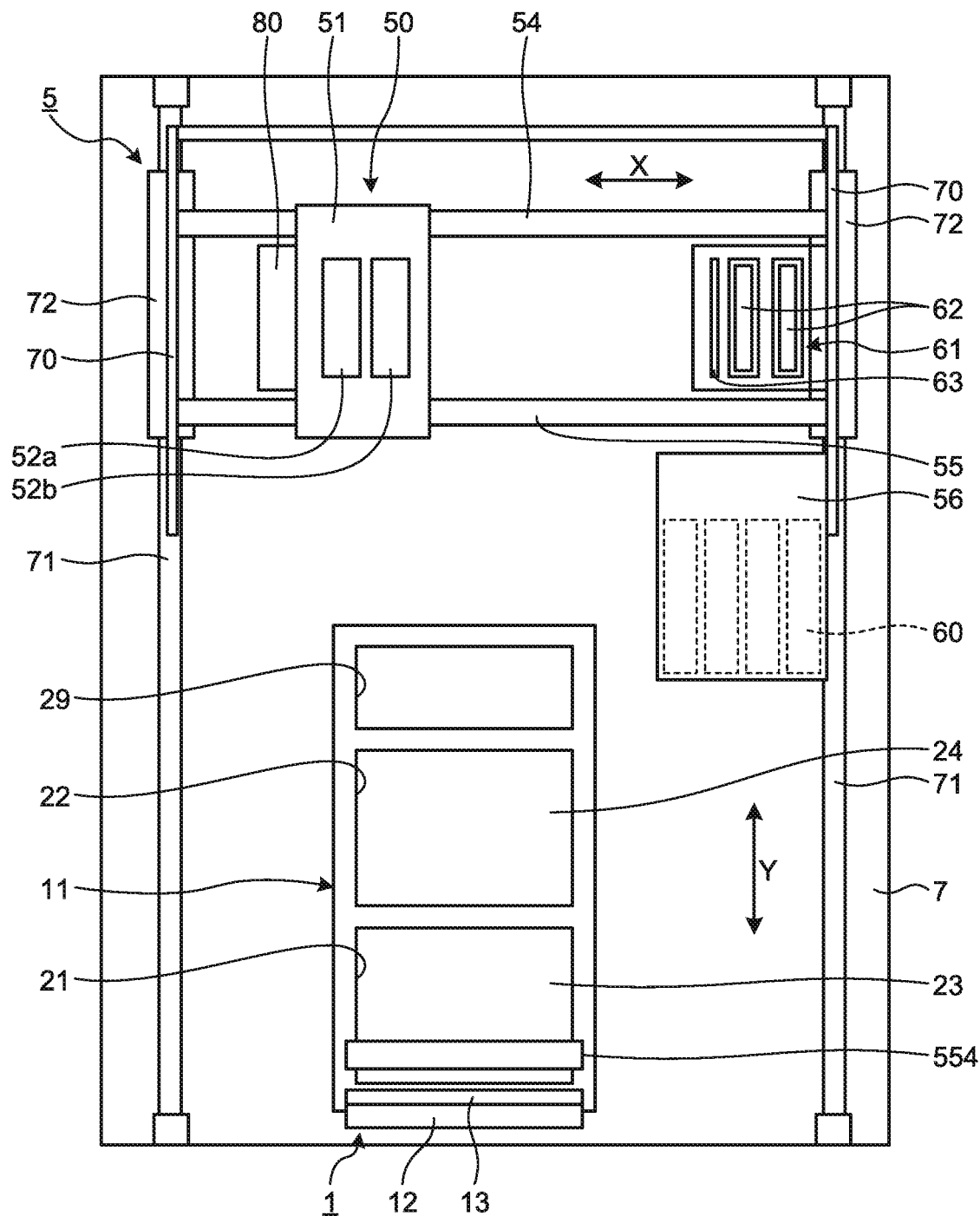
FIG. 1 is a schematic plan view of a three-dimensional fabricating apparatus in an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Hereinafter, an embodiment of a three-dimensional fabricating apparatus and a three-dimensional fabricating method according to the present invention will be described in detail with reference to the accompanying drawings.

The three-dimensional fabricating apparatus of the present embodiment uses a discharge pattern in which in the same carriage scan, a solidifying liquid and a non-solidifying liquid can be discharged adjacent in at least some regions. Thus, it is possible to prevent bleeding and spreading of the solidifying liquid and the non-solidifying liquid and to clarify a boundary between a solidifying portion and a non-solidifying portion of a fabricated product. That is, it is possible to improve the accuracy of a boundary between a fabricator (solidifying portion) and a non-fabricator (non-solidifying portion).

The three-dimensional fabricating apparatus of the present embodiment is a powder fabricating apparatus. As illustrated in FIG. 1, the three-dimensional fabricating apparatus includes a fabricator 1 and a fabrication unit 5. The fabricator 1 forms a layer-wise fabricated product combined with powder. The fabrication unit 5 discharges a fabrication liquid 10 to a powder layer of the fabricator 1, which is spread into layers, to fabricate a three-dimensional fabricated product.

Figure 2:
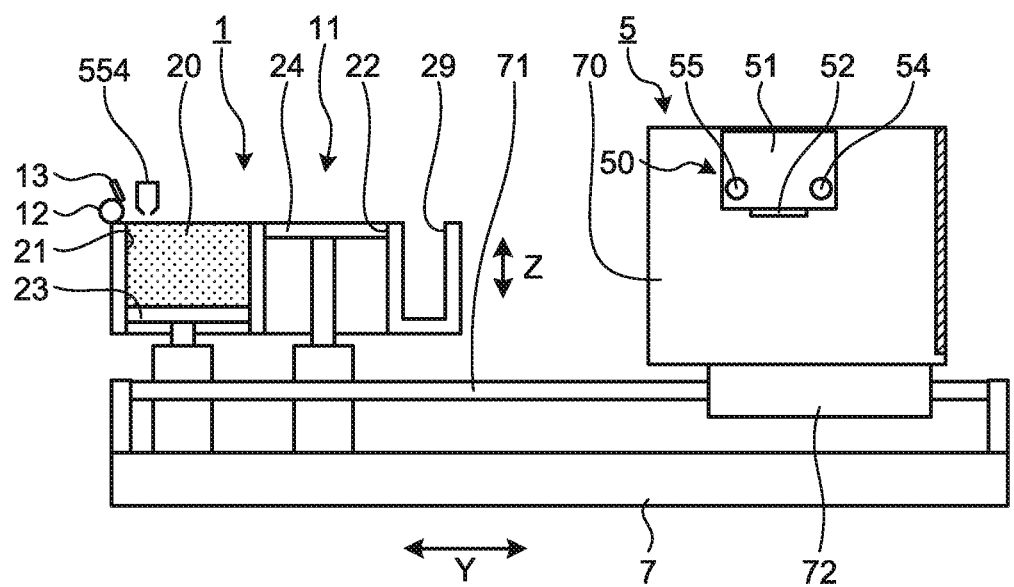
FIG. 2 is a schematic side view of a fabricator in the embodiment.
Figure 3:
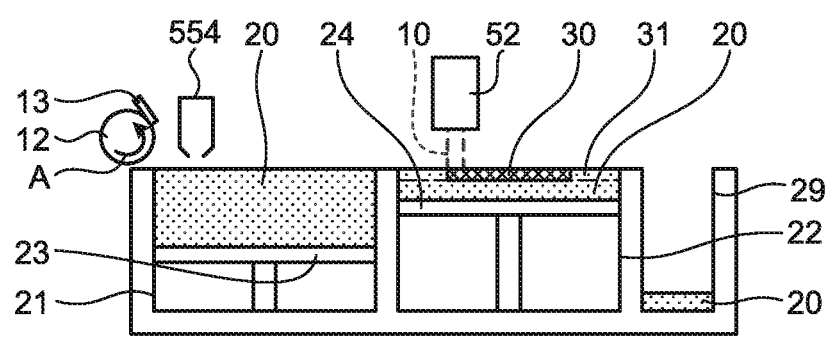
FIG. 3 is a more detailed schematic side view of the fabricator in the embodiment.

First, details of the fabricator 1 will be described with reference to FIGS. 1, 2, and 3. Here, the X direction is a horizontal direction in FIG. 1, and the Y direction is a vertical direction in FIG. 1. The Z direction is a vertical direction in FIG. 2 (the front-rear direction in FIG. 1). FIG. 2 is a cross-sectional view of the fabricator 1 as viewed from the X direction. FIG. 3 is a cross-sectional view of a relevant portion of the fabricator 1 as viewed from the X direction.

As illustrated in FIGS. 1 and 2, the fabricator 1 has a powder chamber 11. The powder chamber 11 includes a supply chamber 21, a fabrication chamber 22, an extra powder receiving chamber 29, a roller member 12, and a powder removing plate 13.

The supply chamber 21 is an example of a supply unit and holds powder 20 supplied to the fabrication chamber 22. A bottom portion of the supply chamber 21 freely elevates and lowers vertically (in the height direction) as a supply stage 23.

In the fabrication chamber 22, a layer-wise fabricated product 30 is stacked to fabricate a three-dimensional fabricated product. A bottom portion of the fabrication chamber 22 freely elevates and lowers vertically (in the height direction) as a fabrication stage 24. A three-dimensional fabricated product in which the layer-wise fabricated product 30 is stacked on the fabrication stage 24 is fabricated.

When a powder layer 31 is formed, of the powder 20 transferred and supplied by the roller member 12 to be described later, extra powder 20 falling without forming the powder layer 31 is accumulated in the extra powder receiving chamber 29. A bottom portion of the extra powder receiving chamber 29 includes a component that suctions the powder 20, and the extra powder receiving chamber 29 can be easily detached.

Figure 4:
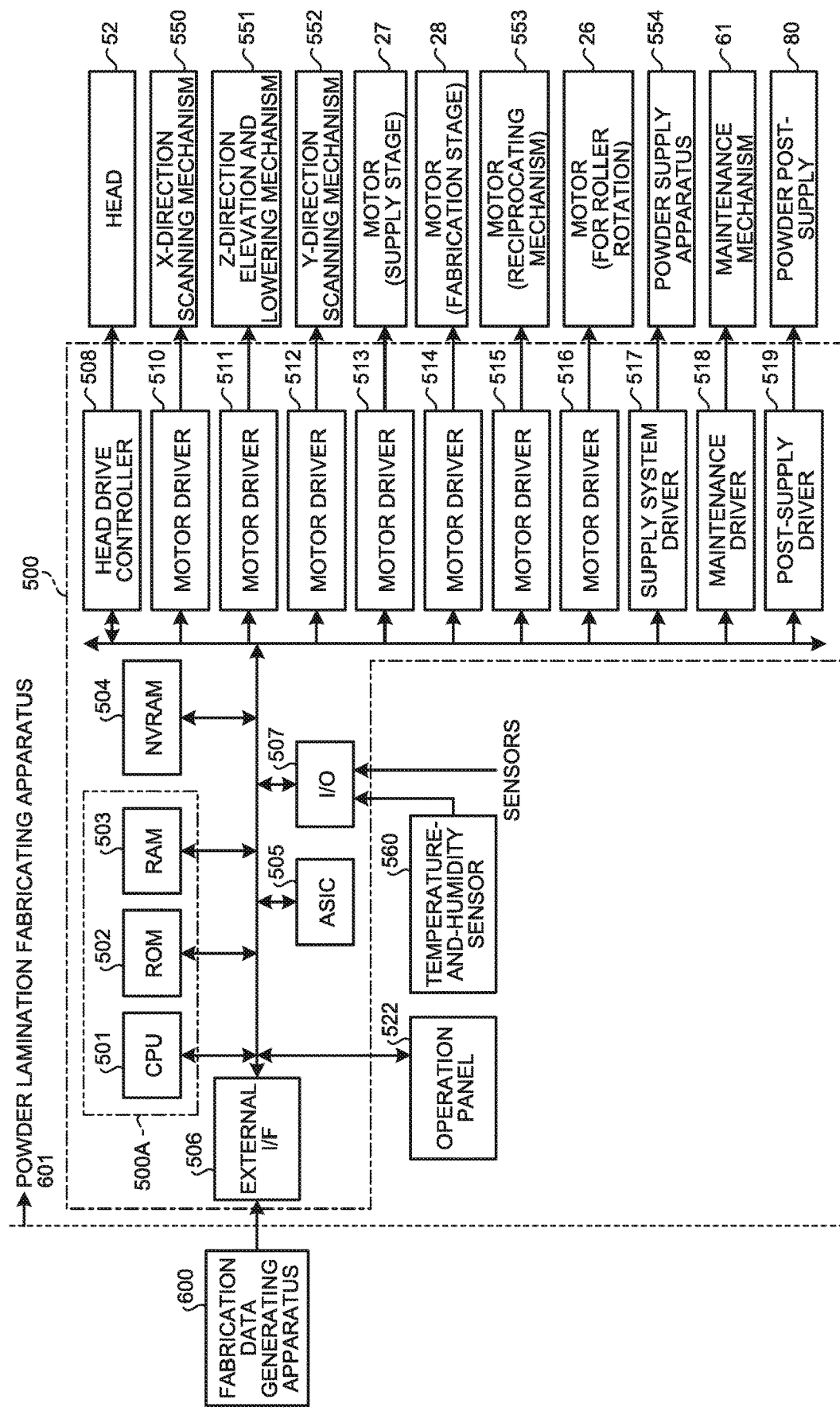
FIG. 4 is a block diagram of a controller in the embodiment.

The supply stage 23 is elevated and lowered in the arrow Z-direction (height direction) by a motor 27 (see FIG. 4), and the fabrication stage 24 is elevated and lowered in the arrow Z-direction by a motor 28 (see FIG. 4).

The roller member 12 is an example of a flattening unit and forms a powder layer. More specifically, the roller member 12 transfers the powder 20, supplied onto the supply stage 23 of the supply chamber 21, to the fabrication chamber 22 to spread and flatten the powder 20 and thus to form the powder layer 31.

The roller member 12 is disposed so as to be reciprocatable relative to a stage surface of the fabrication stage 24 (on which the powder 20 is loaded) along the stage surface in the arrow Y-direction and is moved by a reciprocating mechanism. The roller member 12 is rotated and driven in the arrow A-direction of FIG. 3 by a motor 26 (see FIG. 4) (that is, the roller member 12 is an example of a rotating member).

Next, a configuration of the fabrication unit 5 will be described. As illustrated in FIG. 2, the fabrication unit 5 includes a liquid discharge unit 50. The liquid discharge unit 50 as an example of a discharge unit discharges the fabrication liquid 10 to the powder layer 31 on the fabrication stage 24.

The liquid discharge unit 50 includes a carriage 51 and two (or one or three or more) liquid discharge heads (hereinafter simply referred to as "heads") 52a and 52b mounted on the carriage 51.

The carriage 51 is movably held with guide members 54 and 55. The guide members 54 and 55 are elevatably and lowerably held with lateral side plates 70 provided on both sides of the fabrication unit 5.

The carriage 51 is reciprocated in the arrow X-direction (hereinafter simply referred to as "X direction", and the same applies to "Y direction" and "Z direction") that is a main scanning direction by an X-direction scanning motor, constituting an X-direction scanning mechanism 550 to be described later, via a pulley and a belt.

In each of the two heads 52a and 52b (hereinafter collectively referred to as "head 52" when not distinguished from one another), two nozzle rows in which a plurality of nozzles discharging the fabrication liquid 10 are arrayed are arranged. The two nozzle arrays of the head 52a discharge a cyan fabrication liquid and a magenta fabrication liquid, respectively. The two nozzle arrays of the head 52b discharge a yellow fabrication liquid and a black fabrication liquid, respectively. Note that the configuration of the heads 52 is not limited to this configuration.

A tank mount 56 mounts a plurality of tanks 60 containing the cyan fabrication liquid, the magenta fabrication liquid, the yellow fabrication liquid, and the black fabrication liquid. The fabrication liquids are supplied to the heads 52a and 52b through supply tubes or the like.

The liquid discharge unit 50 is disposed so as to be elevatable and lowerable in the arrow Z-direction together with the guide members 54 and 55 and is elevated and lowered in the Z direction by a Z-direction elevation and lowering mechanism 551 to be described later.

As illustrated in FIG. 1, the fabrication unit 5 includes a maintenance mechanism 61. The maintenance mechanism 61 is provided at one end in the X direction and maintains and recovers the heads 52 of the liquid discharge unit 50.

The maintenance mechanism 61 is mainly constituted of caps 62 and a wiper 63. The caps 62 are brought into close contact with nozzle faces (nozzle formed faces) of the heads 52, and the fabrication liquid 10 is sucked from the nozzles of the heads 52. Thus, the powder 20 clogged at the nozzles and the thickened fabrication liquid 10 are discharged.

The wiper 63 wipes the nozzle faces to form meniscus in the nozzles (with the interiors of the nozzles being in negative pressure state). When the fabrication liquid 10 is not discharged, the maintenance mechanism 61 covers the nozzle faces of the heads 52 with the caps 62 to prevent mixing of the powder 20 inside the nozzles and drying of the fabrication liquid 10.

The fabrication unit 5 has a slider portion 72. The slider portion 72 is movably held by a guide member 71 disposed on a base member 7, and the fabrication unit 5 as a whole is reciprocally movable in the Y direction (sub-scanning direction) perpendicular to the X direction.

The fabrication unit 5 as a whole is reciprocally moved in the Y direction by a Y-direction scanning mechanism 552 to be described later.

Here, details of the fabricator 1 will be described.

As illustrated in FIGS. 2 and 3, the powder chamber 11 has a box-like shape and includes three chambers each having an opening on its top surface. The three chambers are the supply chamber 21, the fabrication chamber 22, and the extra powder receiving chamber 29. The supply chamber 21 includes the supply stage 23 disposed elevatably and lowerably, and the fabrication chamber 22 includes the fabrication stage 24 disposed elevatably and lowerably.

Lateral faces of the supply stage 23 are disposed in contact with inner lateral faces of the supply chamber 21. Lateral faces of the fabrication stage 24 are disposed in contact with inner lateral faces of the fabrication chamber 22. The top faces of the supply stage 23 and the fabrication stage 24 are held horizontally.

The extra powder receiving chamber 29 is provided adjacent to the fabrication chamber 22.

Of the powder 20 transferred and supplied by the roller member 12 when the powder layer 31 is formed, the extra powder 20 falls in the extra powder receiving chamber 29. The extra powder 20 falling in the extra powder receiving chamber 29 is returned to a powder supply apparatus 554 which supplies the powder 20 to the supply chamber 21.

The powder supply apparatus 554 is disposed on the supply chamber 21. In initial operation of fabrication or when the amount of powder in the supply chamber 21 decreases, the powder supply apparatus 554 supplies the powder in a tank constituting the powder supply apparatus 554 to the supply chamber 21. Examples of a method of conveying powder to supply the powder include a screw conveyor method using a screw and an air transfer method using air.

In order to prevent the powder supply apparatus 554 from being in contact with the roller member 12 moving in the Y direction, the powder supply apparatus 554 may be movable in the Y direction or may evacuate in the Z direction. The present invention is not limited to these configurations as long as the powder 20 can be supplied to the supply chamber 21.

The roller member 12 is a long stick-like member longer than the inside dimension (that is, width of the portion where the powder is supplied or placed) of the fabrication chamber 22 and the supply chamber 21 and is reciprocated in the Y direction (sub-scanning direction) along the stage surface by a reciprocating mechanism.

The roller member 12 horizontally moves while rotating in the arrow A-direction of FIG. 3 by the motor 26 and passing over the supply chamber 21 and the fabrication chamber 22 from the outside of the supply chamber 21. Consequently, the powder 20 is transferred and supplied above the fabrication chamber 22, and the powder layer 31 is formed while the roller member 12 passes over the fabrication chamber 22.

As illustrated in FIG. 3, a powder removing plate 13 acting as a powder removing member is disposed to be in contact with a circumference surface of the roller member 12 to remove the powder 20 attached to the roller member 12. The powder removing plate 13 moves together with the roller member 12 while being in contact with the circumference surface of the roller member 12. The powder removing plate 13 may be oriented in any direction to follow or counter a direction of rotation of the roller member 12 to flatten the fabrication liquid 10.

In the present embodiment, although the powder chamber 11 of the fabricator 1 has three chambers: the supply chamber 21, the fabrication chamber 22, and the extra powder receiving chamber 29, the powder chamber 11 may have only the supply chamber 21 and the fabrication chamber 22 or may have only the fabrication chamber 22 to supply the powder from the powder supply apparatus 554 to the fabrication chamber 22 and thus to perform flattening with the roller member 12.

Next, a controller of the three-dimensional fabricating apparatus will be described with reference to FIG. 4. FIG. 4 is a block diagram of the controller.

As illustrated in FIG. 4, a controller 500 includes a main controller 500A. The main controller 500A includes a CPU 501, a ROM 502, and a RAM 503.

The CPU 501 manages the control of the entire three-dimensional fabricating apparatus. The ROM 502 stores therein programs executed by the CPU 501 and other fixed data. The programs stored in the ROM 502 include programs for causing the CPU 501 to execute control of a three-dimensional fabricating operation, which includes control according to the present embodiment. The RAM 503 temporarily stores therein fabrication data and other data.

Furthermore, the controller 500 includes a non-volatile memory (NVRAM) 504, an ASIC 505, and an external I/F 506.

The non-volatile memory (NVRAM) 504 stores therein the data even when the power to the apparatus is shut off.

The ASIC 505 performs image processing to handle various signals related to image data and processes input/output signals to control the apparatus entirely.

The external I/F 506 sends and receives data and signals used in receiving fabrication data from an external fabrication data generating apparatus 600. The fabrication data generating apparatus 600 generates fabrication data in which a final-form fabricated product is sliced into multiple fabrication layers, and is constituted of an information processing apparatus, such as a personal computer.

Furthermore, the controller 500 includes an I/O 507 and a head drive controller 508.

The I/O 507 receives detection signals of various sensors. The head drive controller 508 drives and controls the heads 52 of the liquid discharge unit 50.

Furthermore, the controller 500 includes motor drivers 510, 511, and 512.

The motor driver 510 drives a motor constituting the X-direction scanning mechanism 550 to move the carriage 51 of the liquid discharge unit 50 in the X direction (main scanning direction).

The motor driver 511 drives a motor constituting the Z-direction elevation and lowering mechanism 551 to move (elevate and lower) the carriage 51 of the liquid discharge unit 50 in the Z direction. The motor driver 511 may alternatively elevate and lower the fabrication unit 5 as a whole in the arrow Z-direction.

The motor driver 512 drives a motor constituting the Y-direction scanning mechanism 552 to move the fabrication unit 5 in the Y direction (sub-scanning direction).

Furthermore, the controller 500 includes motor drivers 513, 514, 515, and 516.

The motor driver 513 drives the motor 27 to elevate and lower the supply stage 23. The motor driver 514 drives the motor 28 to elevate and lower the fabrication stage 24. The motor driver 515 drives a motor 553 of the reciprocating mechanism to move the roller member 12. The motor driver 516 drives the motor 26 to rotate and drive the roller member 12.

Furthermore, the controller 500 includes a supply system driver 517 and a maintenance driver 518.

The supply system driver 517 drives the powder supply apparatus 554 to supply the powder 20 to the supply chamber 21. The maintenance driver 518 drives the maintenance mechanism 61 of the liquid discharge unit 50.

Furthermore, the controller 500 includes a post-supply driver 519. The post-supply driver 519 causes a powder post-supply 80 to supply the powder 20.

The I/O 507 of the controller 500 receives detection signals from a temperature-and-humidity sensor 560 and other sensors. The temperature-and-humidity sensor 560 detects temperature and humidity as environmental conditions of the apparatus.

The controller 500 is connected to an operation panel 522. The operation panel 522 inputs and displays necessary information.

The fabrication data generating apparatus 600 and the three-dimensional fabricating apparatus (powder lamination fabricating apparatus) 601 constitutes a fabricating apparatus.

Next, an example of the generation of fabrication data performed by the fabrication data generating apparatus 600 will be described.

First, desired three-dimensional data (for example, CAD data such as STL data) is partitioned in a stacking direction (that is, the Z direction) to generate a plurality pieces of slice data.

Then, presence or absence of droplet discharge corresponding to the X-coordinate and Y-coordinate of each piece of slice data, the size of droplets, the type of droplets, and the like are determined and used for fabrication data.

The above-described fabrication data generation method is merely an example, and this invention is not limited to this method. The fabrication data may be generated by a separate personal computer as a fabrication data generating apparatus, and conversion of desired fabrication data into slice data is not indispensable.

Next, the flow of fabrication will be described with reference to FIG. 5. FIG. 5 is a schematic explanatory view for explaining the flow of fabrication.

The flow of fabrication is described from a state where the layer-wise fabricated product 30 as a first layer is formed on the fabrication stage 24 of the fabrication chamber 22.

First, as illustrated in S101 of FIG. 5, when the next layer-wise fabricated product 30 is formed on the first layer-wise fabricated product 30, the supply stage 23 of the supply chamber 21 is elevated in a Z1 direction, and the fabrication stage 24 of the fabrication chamber 22 is lowered in a Z2 direction (elevate and lower the stage).

At this time, a lowering distance of the fabrication stage 24 is set such that an interval between the surface of the powder layer 31 and a lower portion of the roller member 12 is equal to $\Delta t1$. The interval $\Delta t1$ corresponds to the thickness of the powder layer 31 to be formed next (that is, the pitch of stacking). The stacking pitch $\Delta t1$ is preferably about several tens to hundreds of micrometers.

Next, as illustrated in S102 of FIG. 5, the powder 20 located above an upper surface level of the supply chamber 21 is transferred and supplied to the fabrication chamber 22 by moving the roller member 12 in a Y2 direction (toward the fabrication chamber 22) while rotating the roller member 12 in a forward direction (arrow direction) (supply powder).

As illustrated in S103 of FIG. 5, the roller member 12 is moved in parallel to the stage surface of the fabrication stage 24 of the fabrication chamber 22, and the powder 20 is supplied to the fabrication chamber 22 to form the powder layer 31 having a predetermined thickness $\Delta t1$ (flatten).

The powder layer 31 having the predetermined stacking pitch $\Delta t1$ on the layer-wise fabricated product 30 on the fabrication stage 24 is formed by a flattening process. At this time, as illustrated in S103 of FIG. 5, the extra powder 20 not used in the formation of the powder layer 31 falls in the extra powder receiving chamber 29.

After the powder layer 31 is formed, as illustrated in S104 of FIG. 5, the roller member 12 is moved in the Y1 direction and returned (restored) to an initial position (original position). Here, the roller member 12 can be moved while keeping a constant distance with respect to the upper surface levels of the fabrication chamber 22 and the supply chamber 21, whereby the powder layer 31 having a uniform thickness $\Delta t1$ can be formed on the fabrication chamber 22 or the already formed layer-wise fabricated product 30 while the powder 20 is conveyed onto the fabrication chamber 22 by the roller member 12.

After that, as illustrated in S105 of FIG. 5, droplets of the fabrication liquid 10 are discharged from the heads 52 of the liquid discharge unit 50, and the layer-wise fabricated product 30 is stacked and formed on the powder layer 31 (fabricate).

For the layer-wise fabricated product 30, for example, when the fabrication liquid 10 discharged from the heads 52 is mixed with the powder 20, adhesives contained in the powder 20 are dissolved and the dissolved adhesives bond together to bind the powder 20 and thus form the layer-wise fabricated product 30.

As described above, a process of discharging the fabrication liquid 10 to the powder layer 31 formed by the roller member 12 to form the layer-wise fabricated product 30 in which the powder 20 in the powder layer 31 bond together in a desired shape is referred to as a layer-wise fabricated product formation process. The desired shape means a shape finally forming a portion of a three-dimensional fabricated product.

Then, the processes of S101 to S105 are repeated. At this time, the newly formed layer-wise fabricated product 30 and the lower layer-wise fabricated product 30 are united to form a portion of a three-dimensional fabricated product. The above processes are repeated a required number of times to form a three-dimensional fabricated product (also referred to as a stereoscopic fabricated product).

Figure 6:
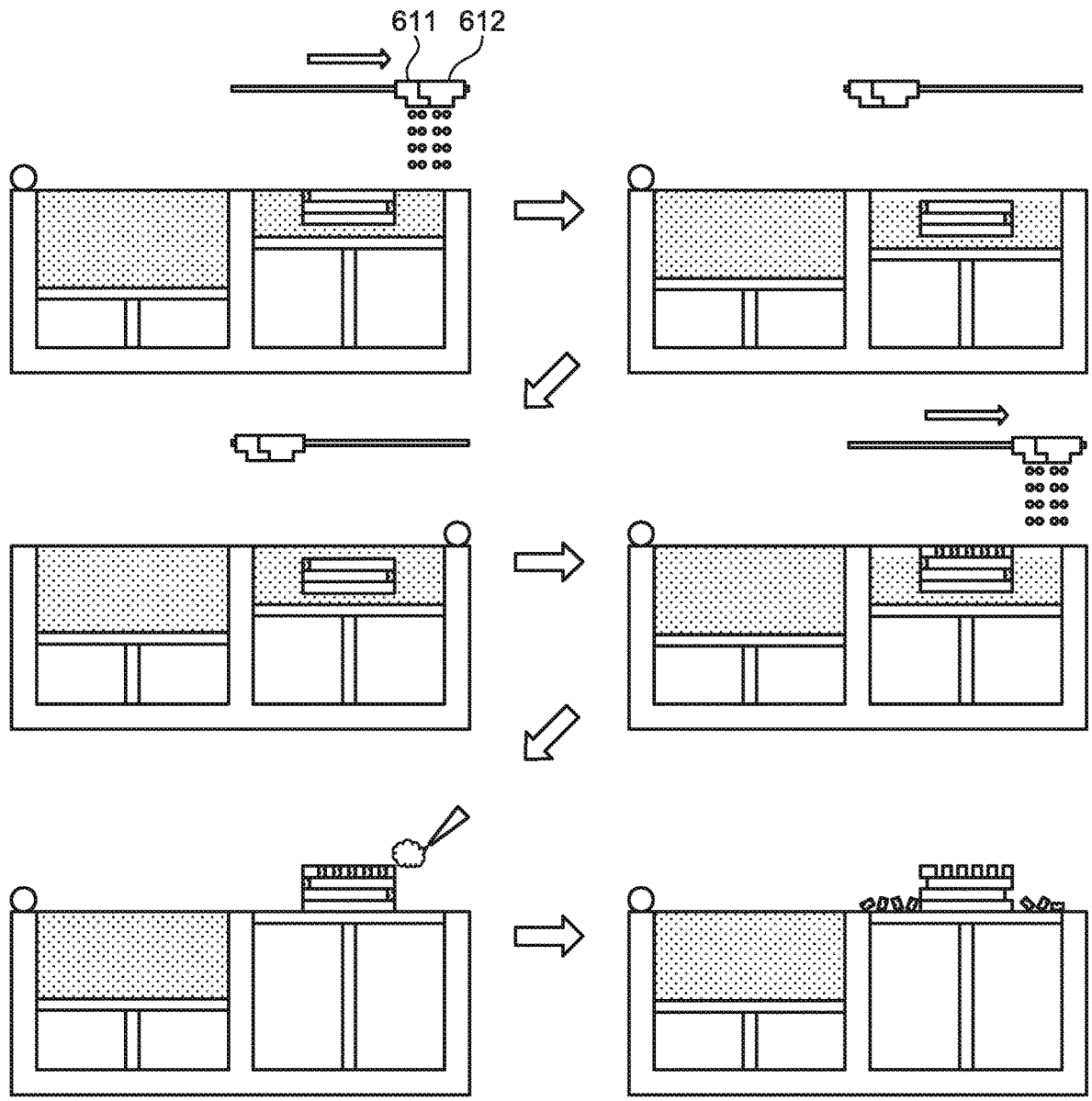
FIG. 6 is a view illustrating a flow of fabrication where a solidifying liquid and a non-solidifying liquid are discharged.

Next, a flow of fabrication where a solidifying liquid (first fabrication liquid) and a non-solidifying liquid (second fabrication liquid) are discharged will be described. FIG. 6 is a view illustrating an example of the flow of fabrication where the solidifying liquid and the non-solidifying liquid are discharged.

As illustrated in the upper left portion of FIG. 6, for example, the heads 52a and 52b in the carriage 51 each discharge a solidifying liquid 611 solidifying powder and a non-solidifying liquid 612. The solidifying liquid 611 is discharged to a region formed as a fabricated product (solidifying portion), and the non-solidifying liquid 612 is discharged to a contour portion of the solidifying portion.

When discharge in one scan is completed, as illustrated in the upper right portion of FIG. 6, the fabrication stage 24 is lowered. After that, as illustrated at the center left of FIG. 6, the next powder layer is formed. As illustrated at the center right of FIG. 6, the solidifying liquid and the non-solidifying liquid are further discharged to the powder layer formed.

When all the layer-wise fabricated products 30 are stacked, as illustrated in the lower left portion of FIG. 6, the fabrication stage 24 is elevated. The powder in a region in which the non-solidifying liquid is discharged is removed, and as illustrated in the lower right portion of FIG. 6, a final three-dimensional fabricated product is formed.

Hereinafter, a specific example of a discharge pattern used for the discharge of the solidifying liquid and the non-solidifying liquid will be described.

The controller 500 controls each of the above sections such that the fabrication liquid is discharged in accordance with the following discharge pattern. In the present embodiment, the controller 500 controls the liquid discharge unit 50 such that the solidifying liquid and the non-solidifying liquid are discharged in accordance with the discharge pattern in which the non-solidifying liquid is discharged to a region adjacent to at least some of a plurality of regions in which the solidifying liquid is discharged.

Figure 7:
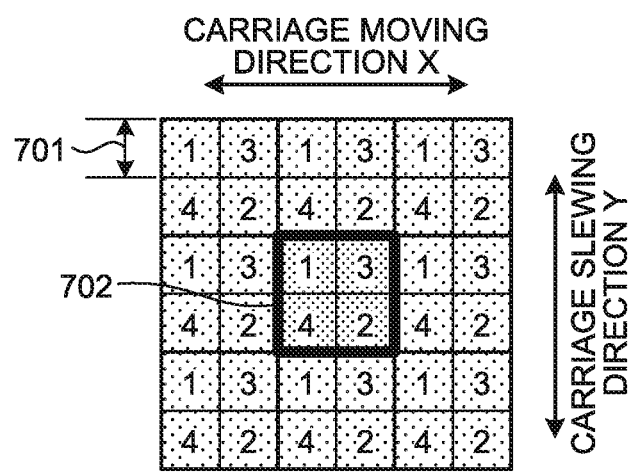
FIG. 7 is a view illustrating an example of a generally used discharge pattern.
Figure 8:
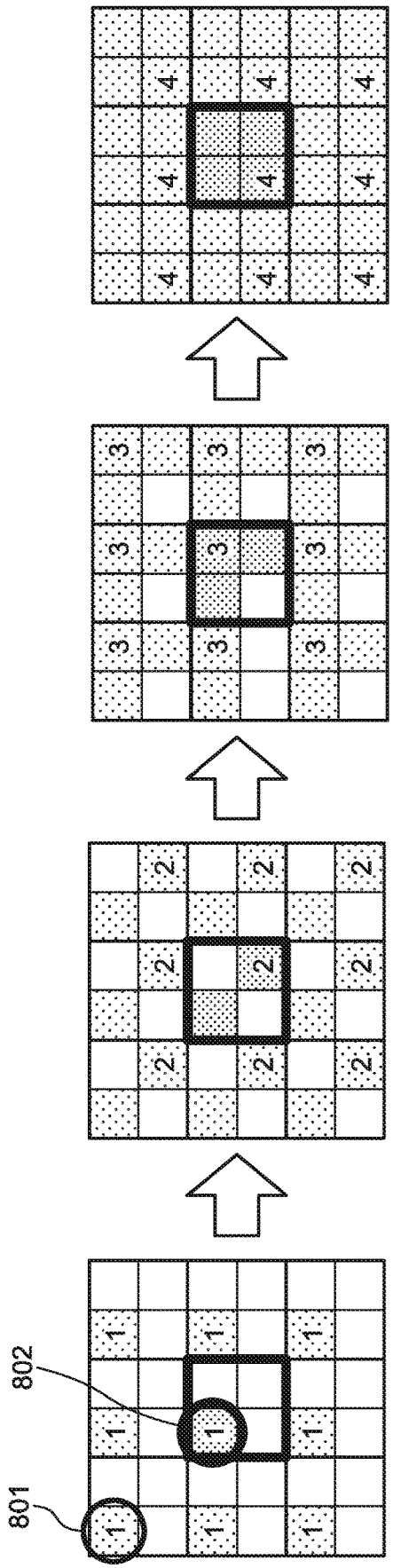
FIG. 8 is a view illustrating a transition example of a discharge position of the general discharge pattern.
Figure 9:
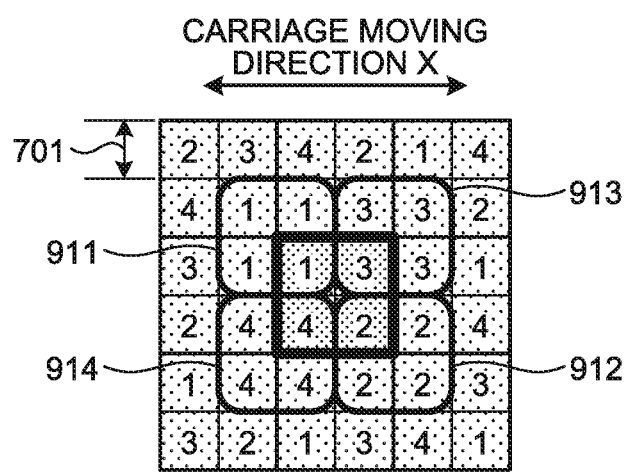
FIG. 9 is a view illustrating an example of a discharge pattern used in the embodiment.
Figure 10:
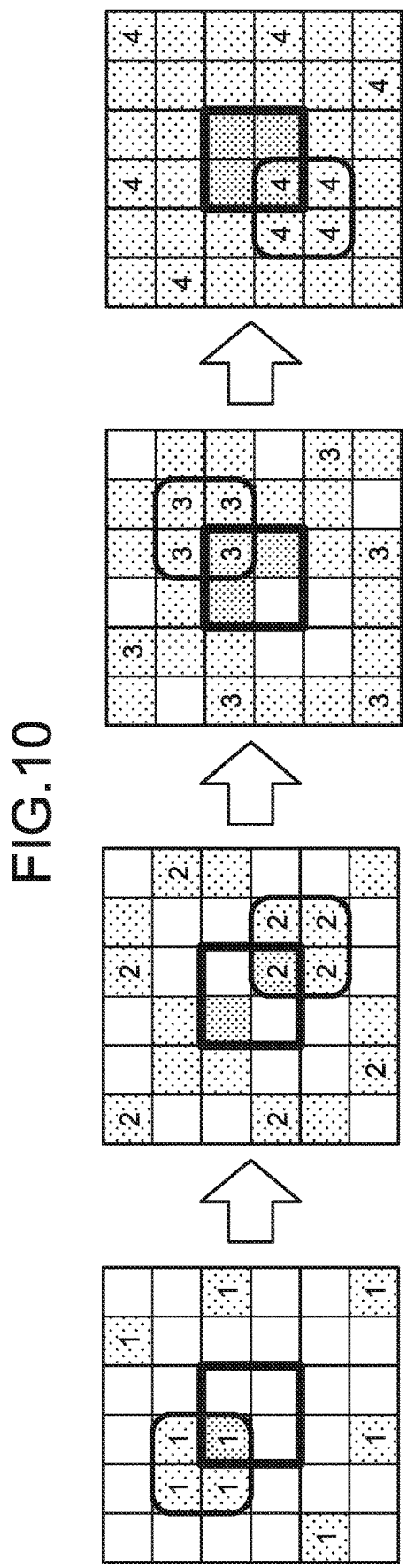
FIG. 10 is a view illustrating a transition example of a discharge position of a discharge pattern of the embodiment.

FIG. 7 is a view illustrating an example of a generally used discharge pattern. FIG. 8 is a view illustrating a transition example of a discharge position when the general discharge pattern is used. FIG. 9 is a view illustrating an example of a discharge pattern used in the present embodiment. FIG. 10 is a view illustrating a transition example of a discharge position when the discharge pattern of the present embodiment is used.

Numerals in the discharge pattern indicate the order of discharge. By one movement (scan) of the carriage 51 in the main scanning direction (X direction), the fabrication liquid is discharged to a region indicated by the same numeral. Hereinafter, the main scanning direction is sometimes referred to as a carriage moving direction. Furthermore, movement of the carriage 51 in the sub-scanning direction (Y direction) is sometimes referred to as slewing of the carriage.

FIG. 7 is an example of a mask pattern used for improving the accuracy of a fabricated product. The mask pattern includes a pattern in which the solidifying liquid is dispersed and discharged. Dispersion and discharge of the solidifying liquid in a fixed discharge region suppresses bleeding and spreading of the liquid in the X direction and the Y direction and leads to the improvement in accuracy of the fabricated product.

The mask pattern of FIG. 7 indicates a pattern in which the fabrication liquid is discharged in units of regions obtained by dividing a region of a predetermined size into four. A height 701 of one unit region corresponds to a nozzle pitch. A region 702 is a region (solidification region) where the solidifying liquid is discharged, and a region around the region 702 is a region (non-solidification region) where the non-solidifying liquid is discharged.

When the mask pattern of FIG. 7 is used, as illustrated in FIG. 8, the discharge of the fabrication liquid is controlled as follows. That is, among the four divided regions, the fabrication liquid is discharged to an upper left region at the first scan. The fabrication liquid is discharged to a lower right region at the second scan. The fabrication liquid is discharged to an upper right region at the third scan. The fabrication liquid is discharged to a lower left region at the fourth scan.

When the mask pattern as illustrated in FIG. 7 is used, in each scan, a position where the solidifying liquid is added dropwise is away from a position where the non-solidifying liquid is added dropwise (for example, a region 801 and a region 802 of FIG. 8), and therefore, the solidifying liquid and the non-solidifying liquid each bleed and spread, which leads to reduce the accuracy of a fabricated product.

FIG. 9 is an example of a discharge pattern used for suppressing such bleeding and spreading. As illustrated in FIG. 9, the discharge pattern of the present embodiment includes a pattern in which the order of discharge is determined such that both the solidifying liquid and the non-solidifying liquid are discharged in the same scan in a portion in which the solidifying liquid and the non-solidifying liquid are adjacent to each other (regions 911 to 914). When the mask pattern of FIG. 9 is used, as illustrated in FIG. 10, the controller 500 can perform control such that the fabrication liquid is discharged in the same scan to the portion in which the solidifying liquid and the non-solidifying liquid are adjacent to each other.

As described above, the discharge pattern of the present embodiment includes such a discharge pattern that the solidifying liquid and the non-solidifying liquid are at least partially adjacent to each other in the same scan. Consequently, it is possible to prevent bleeding and spreading of the solidifying liquid and the non-solidifying liquid and to improve accuracy of a fabricated product. Since the solidifying liquid and the non-solidifying liquid are discharged together in the same scan, productivity can be enhanced.

The solidifying liquid and the non-solidifying liquid may have non-compatibility, whereby removal of extra powder is facilitated. Thus, the accuracy of a fabricated product can be further improved.

The discharge pattern is not limited to the pattern illustrated in FIG. 9. Hereinafter, modifications of the discharge pattern will be described using FIGS. 11 to 15. In each of the figures, the discharge pattern of each modification is illustrated on the right side of the arrow, and an example of the discharge pattern to which the modification is not applied is illustrated on the left side of the arrow.

First Modification

Figure 11:
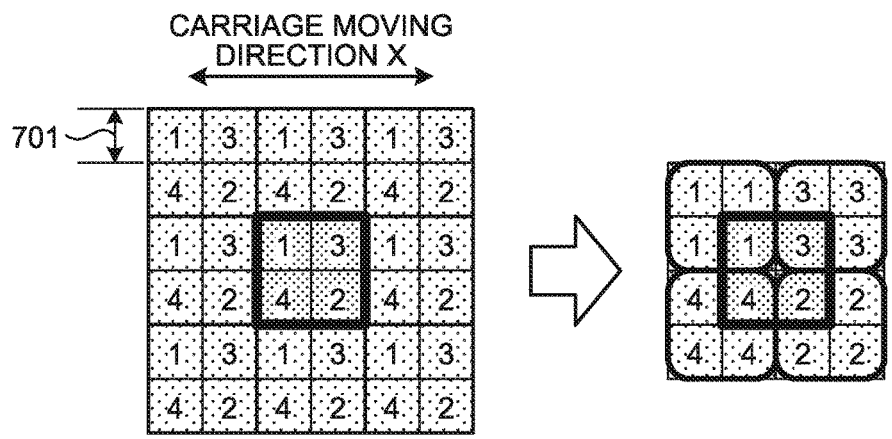
FIG. 11 is a view illustrating a discharge pattern of a first modification.

FIG. 11 illustrates a discharge pattern of a first modification. The discharge pattern of the first modification is an example of a pattern in which a region with the non-solidifying liquid discharged is only a portion adjacent to the solidifying liquid. By virtue of the use of such a discharge pattern, consumption of the non-solidifying liquid can be reduced. Since the amount of powder to which no fabrication liquid is added dropwise increases, recyclability of the powder can be improved.

Second Modification

Figure 12:
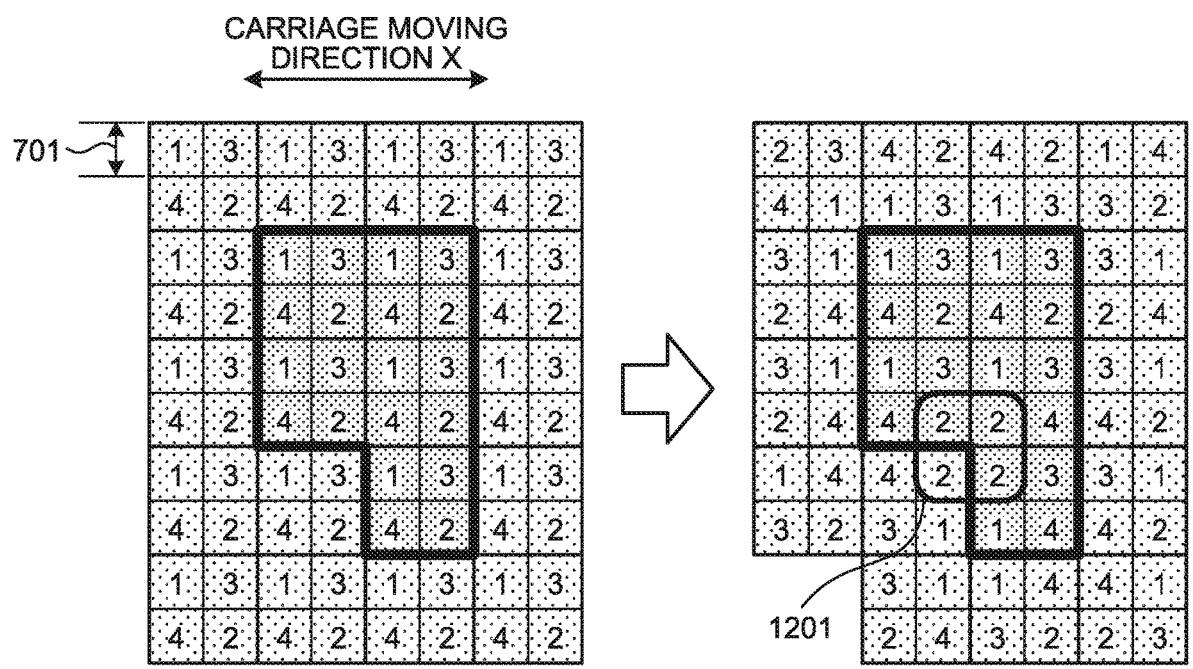
FIG. 12 is a view illustrating a discharge pattern of a second modification.

FIG. 12 illustrates a discharge pattern of a second modification. The discharge pattern of the second modification is an example of a pattern disposed such that in a portion in which the solidifying liquid and the non-solidifying liquid are adjacent to each other (region 1201), the solidifying liquid and the non-solidifying liquid are discharged in the same scan by changing not only the order of discharging the non-solidifying liquid but also the order of discharging the solidifying liquid.

By virtue of the use of such a pattern, even when a boundary surface of a fabricated product (boundary surface between the solidification region and the non-solidification region) is not linear in the X direction and the Y direction, the solidifying liquid and the non-solidifying liquid can be discharged adjacent to each other in the same scan. Accordingly, accuracy of a fabricated product having a curved portion or the like can be improved.

Third Modification

Figure 13:
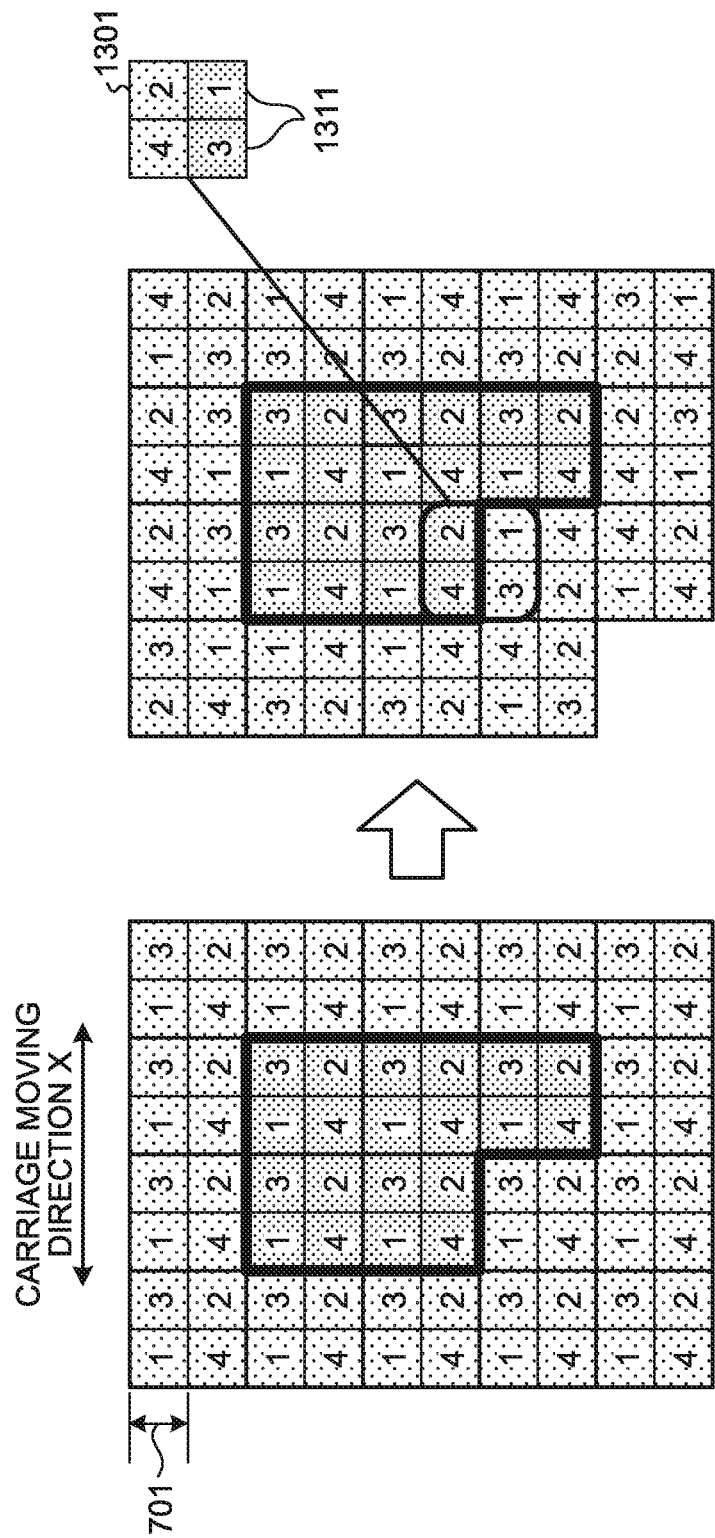
FIG. 13 is a view illustrating a discharge pattern of a third modification.

FIG. 13 illustrates a discharge pattern of a third modification. The discharge pattern of the third modification includes a pattern in which the non-solidifying liquid is discharged before one scan for discharging the solidifying liquid in a part of the portion in which the solidifying liquid and the non-solidifying liquid are adjacent to each other (region 1301). A droplet amount of the non-solidifying liquid discharged before one scan may be smaller than that of the solidifying liquid. In the example of FIG. 13, the non-solidifying liquid with a droplet amount smaller than that of the solidifying liquid is discharged in a region 1311. By reducing the droplet amount, it is possible to prevent bleeding and spreading of the non-solidifying liquid discharged earlier and reduction in the accuracy of a fabricated product.

Fourth Modification

Figure 14:
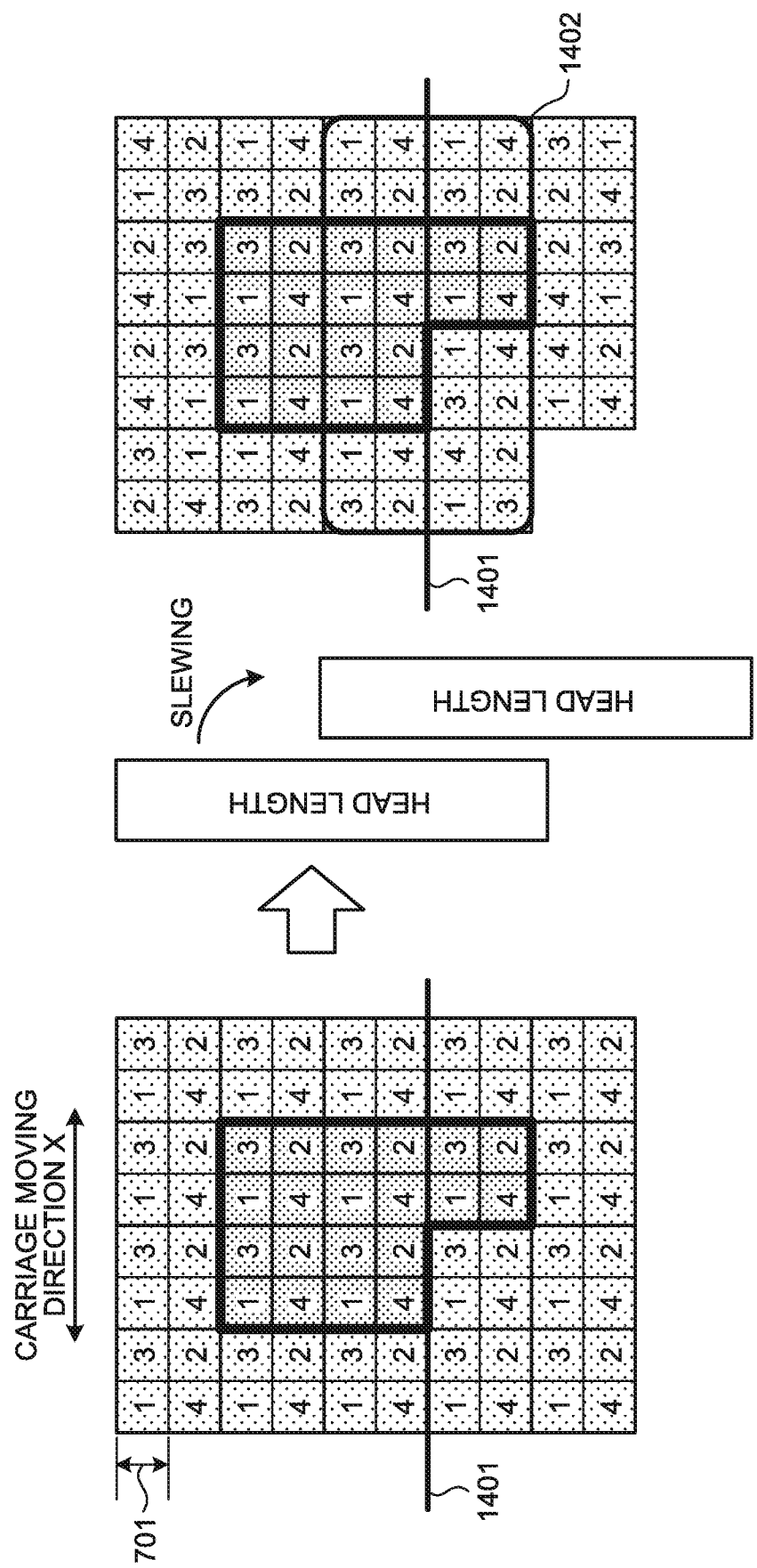
FIG. 14 is a view illustrating a discharge pattern of a fourth modification.

FIG. 14 illustrates a discharge pattern of a fourth modification. The discharge pattern of the fourth modification includes a pattern in which in a region 1402 near a position 1401 where the carriage 51 is slewed, the droplet amounts of the solidifying liquid and the non-solidifying liquid are reduced, and the solidifying liquid and the non-solidifying liquid are discharged in an overlapping manner by a plurality of times of scans. This makes it possible to prevent bleeding and spreading of droplets discharged immediately before the carriage is slewed, which leads to reduced accuracy.

Fifth Modification

Figure 15:
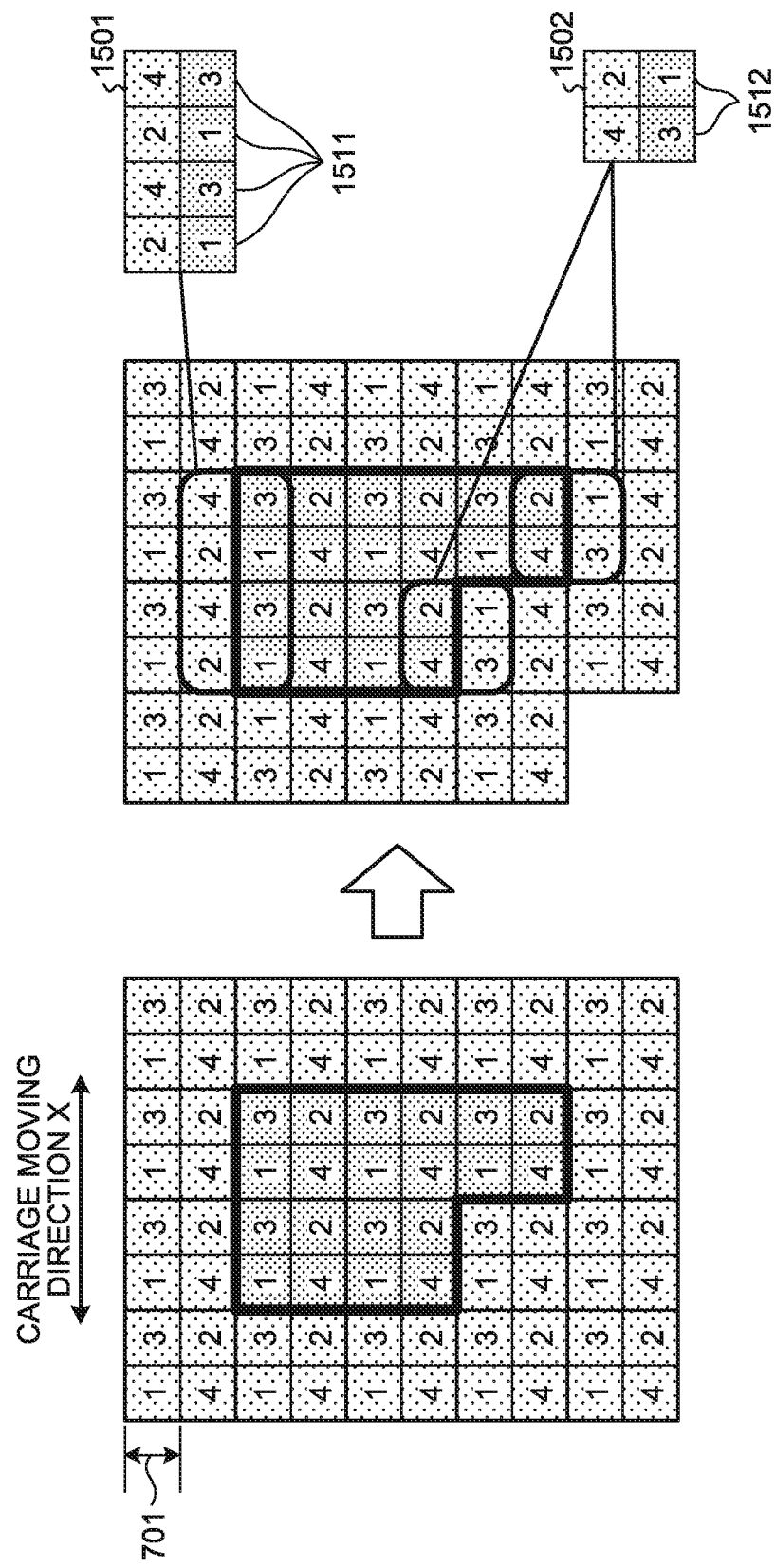
FIG. 15 is a view illustrating a discharge pattern of a fifth modification.

FIG. 15 illustrates a discharge pattern of a fifth modification. The discharge pattern of the fifth modification is an example of a pattern in which discharge (2 passes, ½ interlaced discharge) is performed at the resolution twice the head resolution. Thus, the discharge pattern may include a pattern in which the fabrication liquid is discharged such that the resolution is higher than the head resolution.

The discharge pattern of the fifth modification includes a pattern in which in a part of a boundary portion between the solidifying liquid and the non-solidifying liquid (regions 1501 and 1502), the solidifying liquid is discharged one scan earlier than the non-solidifying liquid, or the non-solidifying liquid is discharged one scan earlier than the solidifying liquid.

In the discharge pattern of the fifth modification, the solidifying liquid and the non-solidifying liquid adjacent to each other in the carriage moving direction (X direction) are discharged in the same scan. The solidifying liquid and the non-solidifying liquid adjacent to each other in a direction (Y direction) in which the carriage is slewed are discharged in two scans performed before and after from each other.

For example, in the region 1501, the solidifying liquid is discharged during scan earlier than the non-solidifying liquid. In this case, since the solidifying liquid is not adjacent to the non-solidifying liquid in the same scan, the droplet amount of the solidifying liquid may be reduced in order to prevent bleeding. For example, in a region 1511, the solidifying liquid with a droplet amount smaller than that of the non-solidifying liquid is discharged.

For example, in the region 1502, the solidifying liquid is discharged during the next scan of the non-solidifying liquid. In this case, since the non-solidifying liquid is not adjacent to the solidifying liquid in the same scan, the droplet amount of the non-solidifying liquid may be reduced in order to prevent liquid bleeding. For example, in a region 1512, the non-solidifying liquid with a droplet amount smaller than that of the solidifying liquid is discharged.

When the amount of droplets discharged before one scan is reduced, it is possible to prevent bleeding and spreading of the fabrication liquid discharged earlier and reduction in the accuracy of a fabricated product.

A program to be executed by the three-dimensional fabricating apparatus according to the present embodiment is stored in advance in the ROM 502 or the like.

The program to be executed by the three-dimensional fabricating apparatus according to the present embodiment may be recorded in a computer-readable recording medium, such as a CD-ROM (compact disc read only memory), a flexible disk (FD), a CD-R (compact disc recordable), or a DVD (digital versatile disc), in a file of an installable or an executable format and provided as a computer program product.

Moreover, the program to be executed by the three-dimensional fabricating apparatus according to the present embodiment may be configured to be stored in a computer connected to a network such as the Internet and provided by downloading via the network. Furthermore, the program to be executed by the three-dimensional fabricating apparatus according to the present embodiment may be configured to be provided or distributed via the network such as the Internet.

The program to be executed by the three-dimensional fabricating apparatus according to the present embodiment can make the computer function as the components of the three-dimensional fabricating apparatus described above. In this computer, the CPU 501 can read the program from a computer-readable storage medium onto a main storage device to execute the program.

Embodiments can provide an advantage of improving the accuracy of a fabricated product fabricated by a powder lamination forming method.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A three-dimensional fabricating method executed by a three-dimensional fabricating apparatus that includes a supply unit that supplies powder, a flattening unit that flattens a surface of the supplied powder and forms a powder layer, and a discharge unit that discharges a first fabrication liquid solidifying the powder and a second fabrication liquid not solidifying the powder onto a surface of the powder layer, the three-dimensional fabricating method comprising:
    causing the discharge unit to discharge the first fabrication liquid and the second fabrication liquid in accordance with a discharge pattern in which the second fabrication liquid is discharged to a region adjacent to at least some of a plurality of regions in which the first fabrication liquid is discharged, the discharge pattern including a plurality of regions, each of the plurality of regions having a same size, and being divided into equal subregions, the causing the discharge unit to discharge the first fabrication liquid and the second fabrication liquid includes
    performing a first scan discharging the first fabrication liquid in a first fabrication liquid subregion based on the discharge pattern and discharging the second fabrication liquid in subregions adjacent the first fabrication liquid subregion based on the discharge pattern, the first scan only discharging the first fabrication liquid or the second fabrication liquid in one of the subregions of each region.

2. The three-dimensional fabricating method according to claim 1, wherein the discharge pattern is a pattern in which the first fabrication liquid and the second fabrication liquid are discharged by one main scanning performed by the discharge unit.

3. The three-dimensional fabricating method according to claim 2, wherein the discharge pattern is at least one of a pattern in which the first fabrication liquid is dispersed and discharged or a pattern in which the first fabrication liquid is discharged such that resolution is higher than resolution of the discharge unit.

4. The three-dimensional fabricating method according to claim 1, wherein
    the discharge pattern comprises at least one of: a pattern in which the first fabrication liquid is discharged by first main scanning, and the second fabrication liquid is discharged by second main scanning after the first main scanning with a droplet amount smaller than that of the first fabrication liquid; or a pattern in which the second fabrication liquid is discharged by first main scanning, and the first fabrication liquid is discharged by second main scanning after the first main scanning with a droplet amount smaller than that of the second fabrication liquid.

5. The three-dimensional fabricating method according to claim 1, wherein
    the discharge pattern comprises a pattern in which the first fabrication liquid and the second fabrication liquid are discharged in an overlapping manner to the same region by a plurality of times of main scanning performed by the discharge unit, such that the first fabrication liquid and the second fabrication liquid are discharged adjacent to each other in a discharging direction of the discharge unit, and droplet amounts of the first fabrication liquid and the second fabrication liquid discharged in the overlapping manner are smaller than those in a case where the first fabrication liquid and the second fabrication liquid are not discharged in an overlapping manner.

6. The three-dimensional fabricating method according to claim 1, wherein
    the first fabrication liquid and the second fabrication liquid have non-compatibility.

7. The three-dimensional fabricating method according to claim 1, wherein
    the discharge pattern includes a solidification region and a non-solidification region,
    each subregion of the solidification region in a boundary portion between the solidification region and the non-solidification region is paired with an adjacent subregion of the non-solidification region in the discharge pattern.

8. The three-dimensional fabricating method according to claim 7, wherein
    the paired subregions have the first fabrication liquid and the second fabrication liquid discharged in a same scan.

9. A three-dimensional fabricating apparatus comprising:
    a supply unit configured to supply powder;
    a flattening unit configured to flatten a surface of the supplied powder and form a powder layer;
    a discharge unit configured to discharge a first fabrication liquid solidifying the powder and a second fabrication liquid not solidifying the powder onto a surface of the powder layer; and
    a controller configured to cause the discharge unit to discharge the first fabrication liquid and the second fabrication liquid in accordance with a discharge pattern in which the second fabrication liquid is discharged to a region adjacent to at least some of a plurality of regions in which the first fabrication liquid is discharged, the discharge pattern including a plurality of regions, each of the plurality of regions having a same size, and being divided into equal subregions, the controller being further configured to perform a first scan discharging the first fabrication liquid in a first fabrication liquid subregion based on the discharge pattern and discharging the second fabrication liquid in subregions adjacent the first fabrication liquid subregion based on the discharge pattern, the first scan only discharging the first fabrication liquid or the second fabrication liquid in one of the subregions of each region.

10. The three-dimensional fabricating apparatus according to claim 9, wherein the discharge pattern is a pattern in which the first fabrication liquid and the second fabrication liquid are discharged by one main scanning performed by the discharge unit.

11. The three-dimensional fabricating apparatus according to claim 10, wherein the discharge pattern is at least one of a pattern in which the first fabrication liquid is dispersed and discharged or a pattern in which the first fabrication liquid is discharged such that resolution is higher than resolution of the discharge unit.

12. The three-dimensional fabricating apparatus according to claim 9, wherein the discharge pattern comprises at least one of: a pattern in which the first fabrication liquid is discharged by first main scanning, and the second fabrication liquid is discharged by second main scanning after the first main scanning with a droplet amount smaller than that of the first fabrication liquid; or a pattern in which the second fabrication liquid is discharged by first main scanning, and the first fabrication liquid is discharged by second main scanning after the first main scanning with a droplet amount smaller than that of the second fabrication liquid.

13. The three-dimensional fabricating apparatus according to claim 9, wherein
the discharge pattern comprises a pattern in which the first fabrication liquid and the second fabrication liquid are discharged in an overlapping manner to the same region by a plurality of times of main scanning performed by the discharge unit, such that the first fabrication liquid and the second fabrication liquid are discharged adjacent to each other in a discharging direction of the discharge unit, and droplet amounts of the first fabrication liquid and the second fabrication liquid discharged in an overlapping manner are smaller than those in a case where the first fabrication liquid and the second fabrication liquid are not discharged in an overlapping manner.

14. The three-dimensional fabricating apparatus according to claim 9, wherein
the first fabrication liquid and the second fabrication liquid have non-compatibility.

* * * * *